United States Patent [19]
Naito

[11] 3,761,793
[45] Sept. 25, 1973

[54] DEVICE FOR CONTROLLING SPEED OF ELECTRIC AUTOMOBILE

[75] Inventor: Shotaro Naito, Katsuta-shi, Japan
[73] Assignee: Hitachi Ltd., Tokyo, Japan
[22] Filed: Mar. 16, 1972
[21] Appl. No.: 235,146

[30] Foreign Application Priority Data
Mar. 19, 1971 Japan.................. 46/15143

[52] U.S. Cl................ 318/327, 318/139, 318/341, 318/345, 318/506
[51] Int. Cl. .......................................... H02p 5/16
[58] Field of Search.................. 318/139, 326, 327, 318/341, 345, 505, 506, 507

[56] References Cited
UNITED STATES PATENTS
3,551,774  12/1970  Rusch ........................ 318/139 X
3,500,161  3/1970  Domann et al. ................. 318/341 X
3,629,615  12/1971  Gurwicz ........................ 318/345 X Primary Examiner—J. D. Miller
Assistant Examiner—H. Huberfeld
Attorney—Paul M. Craig, Jr. et al.

[57] ABSTRACT

In an electric automobile, the motor for driving the wheels is powered by an attached battery through a thyristor chopper circuit. The current conduction rate of the chopper circuit is controlled either by the accelerator pedal in case of manual drive or by making a comparison between the actual driving speed and the instructed speed in case of automatic drive so that the manipulation of the automobile is simplified.

5 Claims, 3 Drawing Figures

3,761,793

DEVICE FOR CONTROLLING SPEED OF ELECTRIC AUTOMOBILE

BACKGROUND OF THE INVENTION

1. Field of the invention the present invention relates to a speed control device for use in an electric automobile and more particularly to a control device capable of so controlling the driving speed of the automobile as to make it coincident with the instructed speeds.

2. Description of the Prior Art

In a conventional automobile, an internal combustion engine has found predominant use as a driving power source. Recently, however, such an engine has come to be disapproved since it has been proved that the exhausted gas from the engine contains poisonous substances that cause contamination of the environment. For this reason, an automobile driven by an electric motor has come to be developed by the trade concerned. Such an electric automobile mainly comprises a battery as a source of electric energy, a driving motor and a control device, and a driver or manipulator can control the driving speed by controlling the current flowing from the battery to the motor by operating the control device. In general, such a driving motor is a dc machine and the associated control circuit is a thyristor chopper circuit. Therefore, the gearing ratio between the driving motor and the wheels may be fixed since the dc motor has a very wide range of rotational speeds. this produces on the one hand a merit that the operation or manipulation of the electric automobile is easy but on the other hand results in a demerit that the accelerator pedal has to be operated continuously during drive.

SUMMARY OF THE INVENTION

One object of the present invention is to provide a control device for use in an electric automobile which can automatically control the speed of the automobile under drive so that the speed may coincide with the instructed one.

Another object of the present invention is to provide a method to inexpensively produce such a control device.

Other objects and features of the present invention will be made apparent from the following detailed description of the invention taken in conjunction with the accompanying drawings.

Briefly, the present invention is concerned with a control device for use in an electric automobile comprising a battery, a thyristor chopper circuit and a driving motor which are connected in series, wherein during automatic drive the current conduction rate of the chopper circuit is automatically increased or decreased depending upon the difference between the signal corresponding to the instructed speed and the signal representative of the actual speed of the automobile under drive.

DESCRIPTION OF THE PREFERRED EMBODIMENTS

Figure 1:
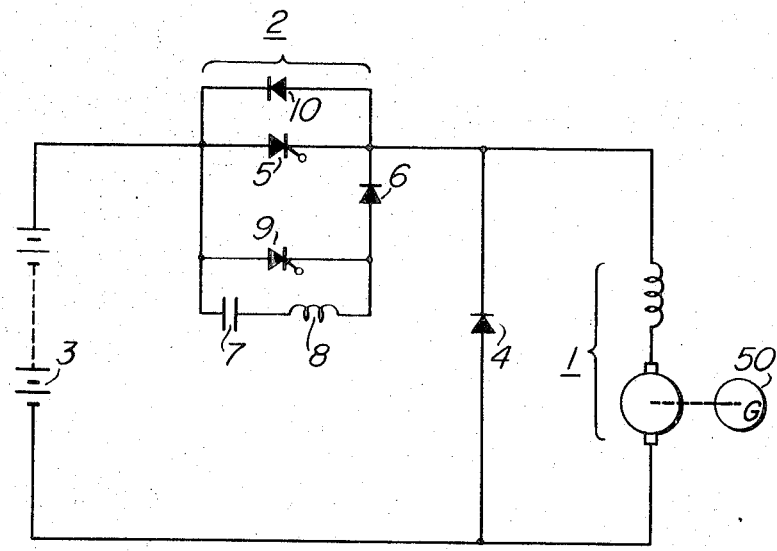
FIG. 1 is an electric connection diagram of the main circuit of a control device embodying the present invention.

Referring to FIG. 1, there is illustrated a main control circuit, in which a driving motor 1 has one of its terminals connected through a thyristor chopper circuit 2 with the positive pole of a battery 3 and the other terminal coupled to the negative pole of the battery 3 while the motor 1 is shunted across a flywheel diode 4. The thyristor chopper circuit 2 comprises a main thyristor 5 inserted in the main control circuit; a series circuit of a diode 6, a capacitor 7 for arc extinction and a reactor 8 which is shunted across the thyristor 5; a thyristor 9 for arc extinction shunted across the series-connected capacitor 7 and reactor 8; and a bypass diode 10 shunted in inverse polarity across the main thyristor 5. The operation of this thyristor chopper circuit 2 is as follows. Namely, the voltage from the battery 3 is applied to the motor 1 upon firing of the thyristor 5 while upon firing of the turn-off thyristor 9 the electric charge stored in the capacitor 7 is released into the reactor 8 so that an oscillating current is generated therein, which extinguishes the main thyristor 5 and the turn-off thyristor 9 to cut off the chopper circuit 2. Therefore, by alternately firing the main thyristor 5 and the turn-off thyristor 9 the thyristor chopper circuit 2 is rendered intermittently conductive and thus the current conduction rate of the chopper circuit 2 is controlled to control the output of the driving motor 1.

Figure 2:
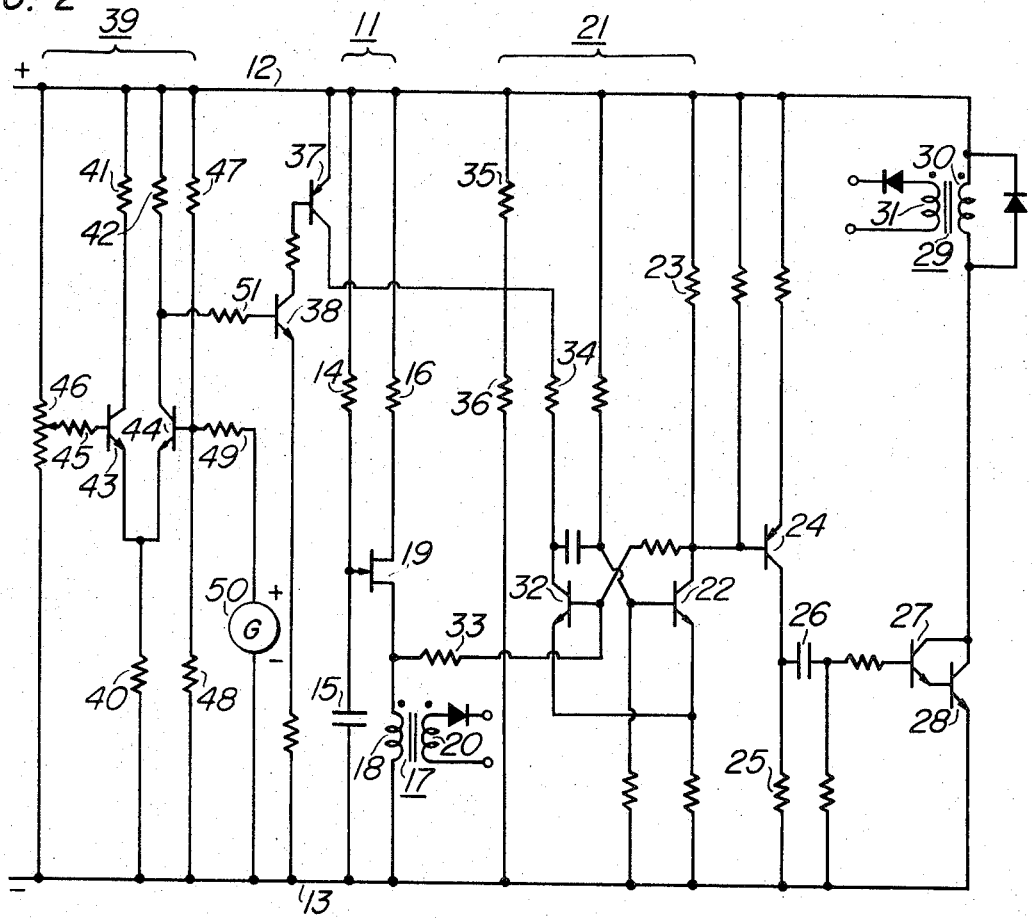
FIG. 2 is an electric connection diagram of an auxiliary circuit in its typical form which constitutes the control device of the invention together with the main circuit.

Now, the case is described where the current conduction rate of the above described chopper circuit 2 is controlled by such an auxiliary circuit as shown in FIG. 2.

Referring to FIG. 2, a pulse oscillator circuit 11 comprising a series circuit of a resistor 14 and a capacitor 15 connected between lines 12 and 13 which are connected with a power supply not shown in this figure and a unijunction transistor 19 which has one of its bases connected through a resistor 16 with the line 12, the other base connected through the primary winding 18 of a pulse transformer 17 with the line 13, and its emitter connected with the junction point of the resistor 14 and the capacitor 15. With this circuit configuration the output current flows through the primary winding 18 of the pulse transformer 17 when the voltage across the capacitor 15 has reached the emitter peak value of the unijunction transistor 19. The ends of the secondary winding 20 of the pulse transformer 17 are connected with the gate and cathode electrodes of the main thyristor 5 in the thyristor chopper circuit 2. In a monostable multivibrator circuit 21, one transistor 22 is normally conductive and has its collector connected through a resistor 23 with the line 12 and also with the base of a transistor 24 to develop a voltage across a resistor connected between the collector of the transistor 24 and the line 13. The voltage across the resistor 25 is then differentiated by a capacitor 26 and therefore the voltage, when it builds up, will render transistors 27 and 28 conductive so that current flows through the primary winding 30 of a pulse transformer 29 which is connected between the line 12 and the collector of the transformer 29 to generate in the secondary winding 31 of the transformer 29 a trigger pulse to fire the turn-off thyristor 9 in the thyristor chopper circuit 2 shown in FIG. 1. On the other hand, the other transistor 32 in the monostable multivibrator circuit 21 is normally cut off and has its base connected through a resistor 33 with the output base of the unijunction transistor 19 and its collector connected through a resistor 34 with the junction point of the voltage dividing resistors 35 and 36. The voltage dividing resistor 35 is shunted across the emitter-collector path of a transistor 37 so that the collector voltage of the transistor 32 of the monostable multivibrator circuit 21 is changed by changing the internal resistance, i.e., emitter-collector resistance, of the transistor 37 to control the quasi-stable period of the multivibrator. The base of the transistor 37 is coupled to the collector of a transistor 38, the base of which is in turn coupled to the output terminal of a differential amplifier circuit 39. The differential amplifier circuit 39 mainly comprises transistors 43 and 44 whose emitters are commonly connected through a resistor 40 with the power supply line 13 and whose collectors are connected respectively through resistors 41 and 42 with the power supply line 12. The base of the transistor 43 is connected through a resistor 45 with the movable contact of a potentiometer 46 which establishes speeds to be instructed during automatic drive. The transistor 44 has its base connected not only with the junction point of voltage dividing resistors 47 and 48 but also with a tachometer generator 50 through a resistor 49 and its collector connected through a resistor 51 with the base of the transistor 38. The tachometer generator 50 is mechanically coupled to the driving motor 1 or one of the wheels (not shown) to generate the output voltage whose magnitude corresponds to the driving speed of the vehicle.

With the circuit configuration as described above, a trigger pulse generated in the secondary winding 20 of the pulse transformer 17 afte the oscillations have built up in the pulse oscillator circuit 11, cause the main thyristor 5 of the chopper circuit 2 to fire. Simultaneously with the ignition of the thyristor 5, the monostable multivibrator 21 is driven into its quasi-stable state so that the transistor 22 is cut off. The period during which the transistor 22 is being cut off is determined by the time constant of the base circuit of the transistor 22 and by the voltage at the collector of the transistor 32, and therefore by setting the cut-off period shorter than the oscillation period of the oscillator circuit 11 the multivibrator 21 will recover its stable state in a constant duration of time. At this time, the transistor 24 also turns conductive and consequently the transistors 27 and 28 are rendered conductive by means of the capacitor 26, so that a trigger pulse is generated from the pulse transformer 29 to fire the turn-off thyristor 9.

Through repetition of such an operation as described above the thyristor chopper circuit 2 is controlled. Here, since the voltage whose amplitude corresponds to the instructed speed is applied to the base of the transistor 43 by means of the potentiometer 46 and since the voltage whose amplitude corresponds to the actual driving speed is applied from the tachometer generator 50 to the base of the transistor 44, the transistor 44 delivers at its collector an output voltage whose amplitude decreases according as the excess of the actual driving speed over the instructed speed becomes greater. Accordingly, when the actual speed of the driving vehicle is in excess of the instructed speed, the internal resistances of the transistors 37 and 38 under conduction are both increased so that the voltage appearing at the collector of the transistor 32 of the multivibrator 21 is lowered with the result that the period of the quasi-stable state of the multivibrator 21 is shortened. And since this period corresponds to the conduction period of the thyristor chopper circuit 2, the decrease in the collector voltage of the transistor 32 directly leads to the decrease in the power fed to the driving motor 1 and therefore the motor 1 is decelerated.

If, on the other hand, the actual speed becomes less than the instructed one, the opposite action takes place. Namely, the conduction period of the chopper circuit 2 is prolonged so that the motor 1 is accelerated. This action will be apparent to shose skilled in the art if they make a simple analysis of the circuit shown in FIG. 2 under the opposite conditions.

As described above, according to the present invention, the trigger interval of the thyristor chopper circuit is controlled by means of the monostable multivibrator circuit in response to the difference between the actual speed of the travelling vehicle and the speed instructed by the automatic control system. As a result, there is provided a simple and inexpensive control device which enables an electric automobile to travel at predetermined constant speeds.

Figure 3:
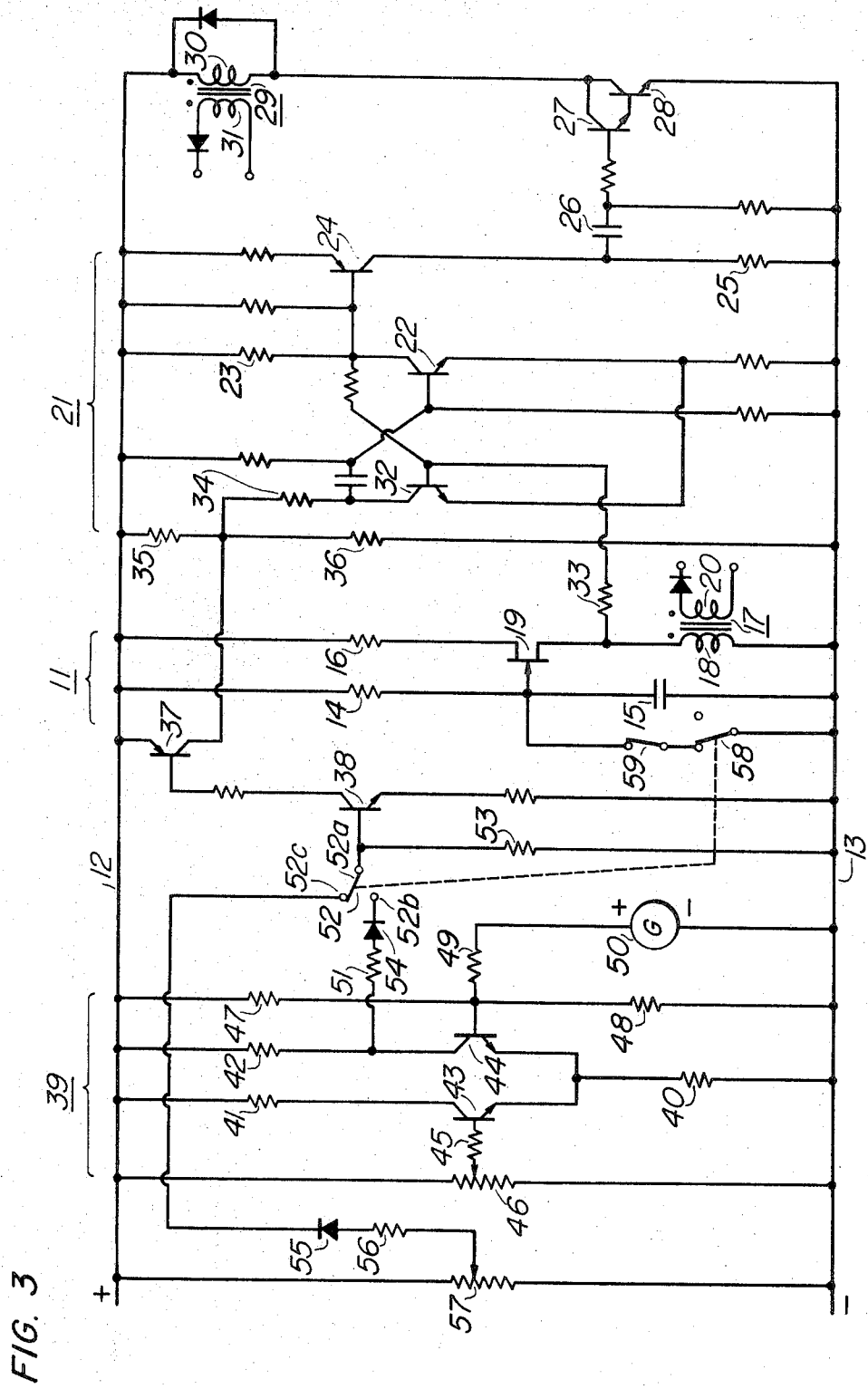
FIG. 3 is an electric connection diagram of another auxiliary circuit which is designed for practical use.

However, in actual driving there is need for changing over between automatic and manual drives. And the auxiliary circuit as it is shown in FIG. 2 should not be used in practical application, but a slightly modified one as shown in FIG. 3 is preferable. In the auxiliary circuit shown in FIG. 3, the base of the transistor 38 is connected with the movable contact 52a of a change-over switch 52 and also with the line 13 through a resistor 53. The stationary contact 52b of the change-over switch 52 is for automatic drive and connected through a diode 54 with one end of the resistor 51. The stationary contact 52c is for manual drive and connected through a series circuit of a diode 55 and a resistor 56 with the sliding contact of a potentiometer 57. The sliding contact of the potentiometer 57 is associated with the accelerator pedal of the automobile and therefore manipulated by the driver. The potentiometer is connected between the lines 12 and 13. Switches 58 and 59 connected in series with each other and shunted across the capacitor 15 are adapted to cease the oscillation of the oscillator circuit 11. Thus, the oscillation will be suppressed only when both the switches 58 and 59 are closed. The switch 58 is associated with the change-over switch 52 and so designed that it may be opened when the movable contact 52a of the switch 52 is brought into engagement with the stationary contact 52b. The switch 59 is associated with the accelerator pedal and so designed that it is closed when the driver completely release the accelerator pedal.

If a driver wants to enjoy automatical driving, it is only necessary for him to bring the movable contact 52a of the change-over switch 52 into engagement with the stationary contact 52b. By doing so, the function of the circuit shown in FIG. 3 is the same as that of the circuit shown in FIG. 2.

On the other hand, if he wants to manually drive the automobile, he has only to shift the movable contact 52a resting on the stationary contact 52b onto the stationary contact 52c. Thus, the transistor 38 is controlled by the output voltage of the potentiometer 57 operated by the accelerator pedal to change the current conduction rate of the thyristor chopper circuit 2. When the accelerator pedal is released completely, the switch 59 is closed so that a short circuit is established between both the ends of the capacitor 15 to suppress the oscillation of the oscillator circuit 11. At the same time, the thyristor chopper circuit 2 is cut off to prevent current from being drawn to the driving motor 1.

As described above, according to the present invention, the change-over between manual control and automatic can be very easily performed.

I claim:

1. A speed control device for use in an electric automobile comprising
   a driving motor which is powered by a dc supply through a thyristor chopper circuit;
   a pulse oscillator circuit;
   a circuit for firing a main thyristor in said thyristor chopper circuit in response to the output of said pulse oscillator circuit;
   a monostable multivibrator circuit which is driven into its quasi-stable state by means of said pulse oscillator circuit;
   a circuit for firing a turn-off thyristor in said thyristor chopper circuit when said multivibrator recovers its stable state; and
   a circuit for controlling the period of said quasi-stable state of said multivibrator depending upon the difference between the instructed speed and the actual driving speed of said automobile.

2. A speed control device according to claim 1, wherein said circuit for controlling the period of said quasi-stable state of said multivibrator comprises a transistor, a manual control circuit, an automatic control circuit which delivers an output in response to the difference between said instructed speed and said actual driving speed, and a change-over switch which selectively connects the baye circuit of said transistor with either the output terminal of said manual control circuit or the output terminal of said automatic control circuit.

3. A speed control device according to claim 2, wherein two switches are further provided which are adapted to suppress the oscillation of said pulse oscillator circuit when both of them are actuated, one of which is actuated when said change-over switch selects said manual control circuit, and the other of which is actuated when the accelerator pedal of said automobile is completely released.

4. A speed control device according to claim 1, further comprising first means providing an output indicative of the instructed speed and second means providing an output indicative of the actual driving speed of said automobile, said circuit being responsive to the outputs of said first and second means for controlling the period of said quasi-stable state of said multivibrator to provide for a constant driving speed for said automobile.

5. A speed control device according to claim 4, wherein said second means includes a tachometer generator mechanically coupled to one of said driving motor and one of the wheels of said automobile.

* * * * *